Nov. 28, 1933.   V. BENDIX   1,936,569

BRAKE

Filed Dec. 13, 1928

INVENTOR.
VINCENT BENDIX
BY
ATTORNEY

Patented Nov. 28, 1933

1,936,569

UNITED STATES PATENT OFFICE 1,936,569

BRAKE

Vincent Bendix, Chicago, Ill., assignor to Bendix Brake Company, South Bend, Ind., a corporation of Illinois Application December 13, 1928
Serial No. 325,742

10 Claims. (Cl. 188—76)

This invention relates to brakes, and is illustrated as embodied in novel operating mechanism for a front wheel automobile brake. An object of the invention is to provide simple operating means which will not interfere with the swiveling of the wheels and which will operate a brake of the type including external and internal shoes gripping the braking flange of brake drum between them. Preferably a lever or equivalent means, arranged to swivel with the wheel and on which the shoes are operatively mounted, has a part swinging crosswise of the swiveling axis of the wheel, and which is engaged by a part of a non-swiveling operating means or lever. One of these interengaging parts is arranged substantially at the swiveling axis when the brake is applied.

I prefer to mount the shoes pivotally on a radial lever extending across the braking flange of the drum. An important minor feature relates to mounting the shoes frictionally, so that the eccentricities of the drum will wipe the shoes about their pivots away from the drum when the brake is released.

Figure 1:
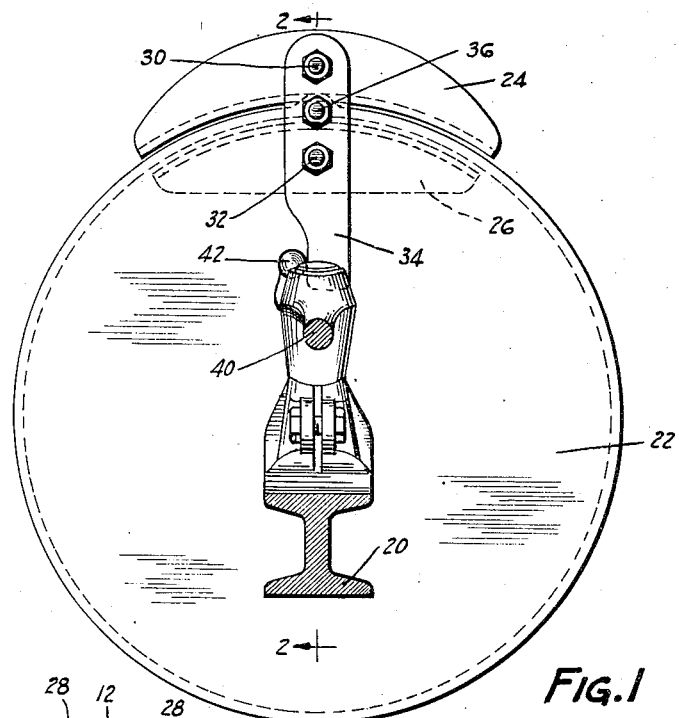
Figure 2:
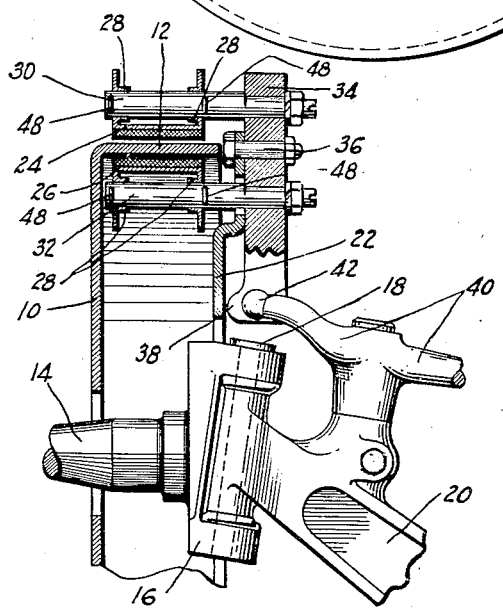

The above and other objects and features of the invention, including various novel and desirable details of construction, will be apparent from the following description of the illustrative embodiment shown in the accompanying drawing, in which:

Figure 1 is a vertical section, through the front axle, looking outwardly at the left front brake; and Figure 2 is a partial vertical section through the brake, on the line 2—2 of Figure 1.

The illustrated brake includes a drum 10 having a cylindrical braking flange 12 and rotating with the wheel (not shown). The wheel is journaled on the spindle 14 of a knuckle 16 which is swiveled by a king-pin 18 or the like to the end of the axle 20. A support such as a backing plate 22 secured to knuckle 16 is arranged at the open side of the drum.

The brake shown is of the type including external and internal shoes 24 and 26, preferably channel-shaped in structure, arranged to grip the flange 12 between them in applying the brake. These shoes are shown as pressed from sheet steel, and faced with the usual brake lining friction material. The sides of the shoes are formed with drawn tubular bearings 28, frictionally but lightly gripping pivots 30 and 32 rigidly mounted on an operating lever 34.

Lever 34 is arranged radially of the drum on a pivot 36 carried by plate 22, and which pivot is between the pivots 30 and 32; and the lever has at its lower end a spade-shaped part 38 swinging crosswise of the swiveling axis. Lever 34 is operated by means such as a horizontal lever 40 fulcrumed on the axle 20 so that it does not swivel with the wheel, and which has at its outer end a ball-shaped part 42 in thrust engagement with the spade 38. When the brake is applied, the center of ball 42 is in or immediately adjacent the swiveling axis of the wheel, i. e., the axis of the king-pin 18.

In operation, the swinging of lever 34 in applying the brake, in a counter-clockwise direction, will cause the shoes 24 and 26 to grip the flange 12 between them. When the brake is released, the shoes tend to maintain their applied angular positions with respect to pivots 30 and 32, which tends to cause a drag at the right end of shoe 24 and the left end of shoe 26. However, the eccentricities of the drum, which are never entirely absent, wipe these ends of the shoes away from the drum just sufficiently to cause the shoes to clear the drum.

Cotter pins 48 may be provided for the purpose of positively limiting axial movement of the shoes on the pivots 30 and 32.

While one illustrative embodiment has been described in detail, it is not my intention to limit the scope of the invention to that particular embodiment, or otherwise than by the terms of the appended claims.

I claim:

1. A brake for a swiveled wheel comprising, in combination, a drum having a braking flange, external and internal shoes arranged to grip the flange between them, means for operating said shoes swiveling with the wheel and including a part swinging crosswise of the swiveling axis, and means having a part operatively engaging said first part and also swinging crosswise of the swiveling axis, one of said parts being substantially at the swiveling axis when the brake is applied.

2. A brake for a swiveled wheel comprising, in combination, a drum having a braking flange, external and internal shoes arranged to grip the flange between them, a lever for operating said shoes swiveling with the wheel and having a part swinging crosswise of the swiveling axis, and a second lever pivoted on a fixed support having a part operatively engaging said first part and also swinging crosswise of the swiveling axis, one of said parts being substantially at the swiveling axis when the brake is applied.

3. A brake comprising a backing plate, a drum associated therewith having a flange, external and internal shoes adapted to grip said flange between them, and a lever pivoted on the backing plate, said backing plate being located between said lever and said drum extending radially of the drum and crossing said flange and on which both of said shoes are pivotally mounted.

4. A brake comprising, in combination, a backing plate, a drum, shoes adapted to grip a portion of the drum between them, and a frictional pivotal mounting on the backing plate, said backing plate being located between said pivotal mounting and said drum for the shoes adapted to hold them in any angular positions in which they may be placed, so that the drum eccentricities will wipe the shoes away from the drum when the brake is released.

5. A brake comprising a backing plate, a drum associated therewith and on one side thereof having a peripheral flange, a lever pivoted on the backing plate and frictionally engaging the plate, supports on the lever positioned on the respective sides of the flange and friction members positioned on the supports adapted to engage the flange, said lever being positioned upon the other side of said backing plate.

6. A brake comprising a backing plate, a drum associated therewith having a flange, a lever frictionally pivoted on the backing plate and extending radially across the plate the said plate separting said lever from the said drum, supports on the lever, friction elements pivotally mounted on the supports, and a thrust member for moving the lever to engage the friction members with the flange.

7. A brake for a dirigible wheel comprising a backing plate adapted to swivel with the wheel, a drum associated therewith having a flange, a lever pivotally positioned on the backing plate and extending radially thereon, supports on the lever, friction members on the supports adapted to engage the flange and a lever pivoted on a fixed support and adapted to swing transversally of the swivelling axis of the wheel and drum to actuate the lever pivoted on the drum for engaging the friction members with the flange.

8. A brake comprising a drum and a backing plate, internal and external brake shoes for said drum, a lever pivoted upon the outside of said backing plate, supports upon said lever for said brake shoes, the support for the internal brake shoe passing through a slot in said backing plate.

9. A brake comprising a drum, a backing plate therefore having a slot therein, a radially disposed lever pivoted upon the outside of said backing plate adjacent said slot, an internal brake shoe mounted upon a pin secured to said lever and passing through said slot.

10. A brake comprising a drum and a backing plate therefore, a lever mounted upon the outside of said backing plate, and a pin on said lever passing through a slot in said backing plate and supporting a brake shoe in operative relation to said drum.

VINCENT BENDIX.